Sept. 16, 1930.  E. MILLMATHER  1,775,942
AERATING APPARATUS
Filed Aug. 21, 1929
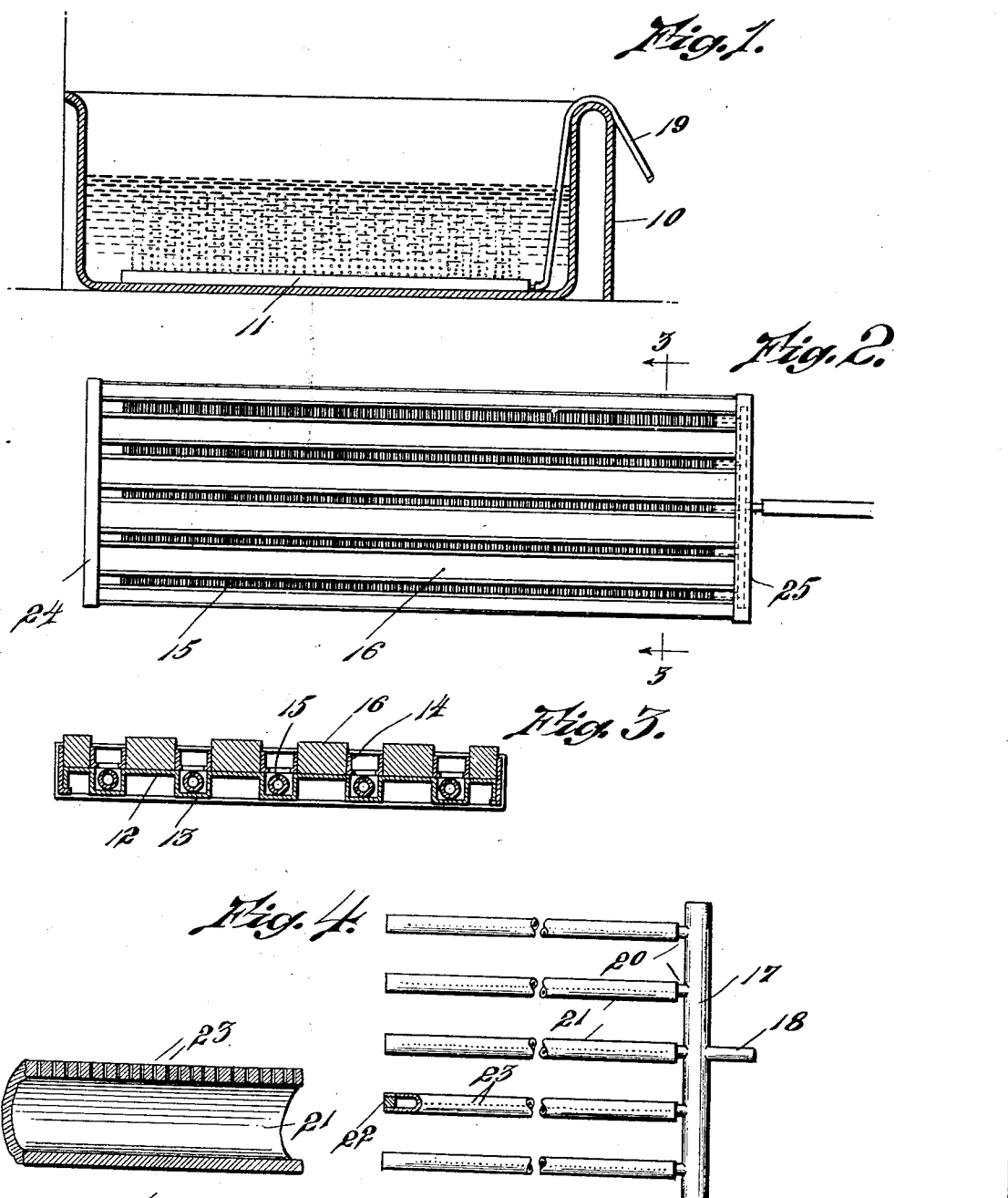

Patented Sept. 16, 1930

1,775,942

UNITED STATES PATENT OFFICE

ERNEST MILLMATHER, OF PROVIDENCE, RHODE ISLAND

AERATING APPARATUS

Application filed August 21, 1929. Serial No. 387,367.

The present invention relates to bath aerating apparatus, and has particular reference to apparatus suitable for insertion in bathtubs.

One object of the invention is to provide a portable device of this character.

Another object of the invention is to provide a self-sealing construction which will prevent entrance of water in the air supply tube.

A further object is to simplify the manufacture and the construction of devices of this character.

A still further object is to provide a cushion support for the body securely mounted on the rack.

Other objects and advantageous features will be readily apparent from the detailed description following, in conjunction with the accompanying drawings, and will be particularly pointed out in the appended claims.

In the drawings:

Fig. 1 is a side elevation, partly in section, showing the improved aerating device in position in a bath tub;

Fig. 2 is a top plan view of the device, showing the rack for supporting the bather;

Fig. 3 is a section on the line 3—3 of Fig. 2;

Fig. 4 is a plan view of the aerating conduits; and

Fig. 5 is an enlarged sectional detail showing the aerating openings.

It is found in practice that there is a leakage of water into the aerating conduits during use, with the result that the water renders parts of the aerating conduits inoperative and thus prevents the desired uniformity of flow and of pressure. I have therefore devised an aerating apparatus which includes a series of aerating conduits, each conduit having a plurality of small self-sealing openings; and the following is a detailed description of a preferred constructional embodiment of my invention.

Referring to the drawings, 10 designates the usual form of bath tub in which a rack member 11 of suitable size and shape may be positioned. This rack member may be constructed of any suitable material, galvanized iron or zinc being preferable, and includes a body member 12 formed with channels 13 therein, a series of channel members 14 secured to the body member, preferably by welding, being positioned over the channels 13 and having transverse slits or slots 15 extending along the length thereof. Strips of rubber or the like 16 which, for example, may be of sponge rubber, are positioned on the body member 12 between adjacent side walls of the channel member 14 to comfortably support the body of the bather, and may be secured in position in any desired manner.

The aerating supply structure includes a header 17, preferably of metal, having an inlet connection 18 to which a flexible conduit 19 may be detachably connected, and a series of spaced outlet connections 20, each of which is detachably connected to aerating conduits 21 adapted to be inserted and positioned within the channels 13.

Each aerating conduit 21 is preferably formed of flexible, resilient or elastic material, such as rubber, is closed at the free end, as by a plug 22, and has a series of small spaced aligned apertures 23 in the upper portion thereof, normally positioned below the slits or slots 15. The apertures 23 are sufficiently small to permit water-tight closing thereof by the inherent elasticity of the aerating conduit material. The rack is provided with end channels 24, 25 adapted to enclose the ends of the channels and channel members.

The operation of the improved aerating device is as follows:

Air, which may be carbonated or perfumed, or heated, if desired, is admitted under pressure to the aerating conduits 21 through the header 17; the pressure slightly expands each conduit 21, thus opening the apertures 23 and permitting the air to gently bubble through the bath water and beneficially react on the bather to soothe and rest the nerves. When the air supply is shut off, the apertures 23 shut and prevent entrance of water into the aerating conduits.

While I have described a specific embodiment of my invention, desired changes in structure or arrangement to suit the needs of particular installations may obviously be made, within the scope of invention as defined in the appended claims.

I claim:

1. In a bath aerating apparatus, a body member having channels therein, closure members for said channels having side walls and bottom walls, said bottom walls having a plurality of spaced slits along the length thereof, supports positioned between side walls of adjacent closure members for supporting a bather, and aerating conduits in said channels having self-closing apertures along the length thereof opening under pressure.

2. In a bath aerating apparatus, a body member having channels therein, closure members for said channels having side walls and bottom walls, said bottom walls having a plurality of spaced slits along the length thereof, supports positioned between side walls of adjacent closure members for supporting a bather, and aerating conduits in said channels having aligned self-closing apertures along the length thereof opening under pressure.

3. In a bath aerating apparatus, a body member having channels therein, closure members for said channels having side walls and bottom walls, said bottom walls having a plurality of spaced slits along the length thereof, resilient supports positioned between side walls of adjacent closure members for supporting a bather, and aerating conduits in said channels having apertures along the length thereof.

4. In a bath aerating apparatus, a body member having parallel channels therein, closure members for said channels having side walls and bottom walls, said bottom walls having a plurality of spaced slits along the length thereof, supports positioned between side walls of adjacent closure members for supporting a bather, aerating conduits in said channels having self-closing apertures along the length thereof opening under pressure, a supply header, and connections between said conduits and said supply header.

5. In a bath aerating apparatus, a body member having channels therein, with openings extending along the top walls of said channels, aerating conduits in said channels having apertures along the length thereof, and cushioning supports on said body member between the channels to support the bather.

6. In a bath aerating apparatus, a body member having channels therein, with spaced openings extending along the top walls of said channels, aerating conduits in said channels having apertures along the length thereof, and cushioning supports formed of strips of sponge rubber on said body member between the channels to support the bather.

7. In a bath aerating apparatus, a rack having channels therein, said channels having spaced openings along the top walls thereof, aerating conduits formed of rubber in said channels having self-closing apertures along the length thereof adapted to open under internal pressure, and strips of cushioning material between said channels for the support of the bather.

8. In a bath aerating apparatus, a rack having channels therein, said channels having spaced openings along the top walls thereof, aerating conduits formed of rubber in said channels having self-closing apertures along the length thereof arranged to open under internal pressure, strips of sponge rubber between said channels, and means engaging said strips for frictionally retaining said strips in position in the rack.

In testimony whereof I affix my signature.

ERNEST MILLMATHER.